(12) United States Patent
Kato et al.

(10) Patent No.: US 9,217,096 B2
(45) Date of Patent: Dec. 22, 2015

(54) FILM FORMING COMPOSITION FOR HARD DISK

(75) Inventors: Taku Kato, Funabashi (JP); Keisuke Shuto, Funabashi (JP); Junpei Kobayashi, Funabashi (JP); Masayoshi Suzuki, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

(21) Appl. No.: 13/996,755

(22) PCT Filed: Dec. 21, 2011

(86) PCT No.: PCT/JP2011/079655
§ 371 (c)(1),
(2), (4) Date: Jun. 21, 2013

(87) PCT Pub. No.: WO2012/086692
PCT Pub. Date: Jun. 28, 2012

(65) Prior Publication Data
US 2013/0270222 A1    Oct. 17, 2013

(30) Foreign Application Priority Data
Dec. 22, 2010 (JP) ................................. 2010-285740

(51) Int. Cl.
| | | |
|---|---|---|
| *C09D 147/00* | (2006.01) | |
| *G11B 5/84* | (2006.01) | |
| *B44C 1/22* | (2006.01) | |
| *C08F 212/08* | (2006.01) | |
| *C08F 212/14* | (2006.01) | |
| *C08F 212/36* | (2006.01) | |
| *C09D 125/08* | (2006.01) | |
| *C09D 125/18* | (2006.01) | |
| *G11B 5/855* | (2006.01) | |
| *C09D 133/14* | (2006.01) | |
| *G11B 5/65* | (2006.01) | |
| *C08F 220/64* | (2006.01) | |
| *C08F 222/10* | (2006.01) | |

(52) U.S. Cl.
CPC ............ *C09D 147/00* (2013.01); *C08F 212/08* (2013.01); *C08F 212/145* (2013.01); *C08F 212/36* (2013.01); *C09D 125/08* (2013.01); *C09D 125/18* (2013.01); *C09D 133/14* (2013.01); *G11B 5/8408* (2013.01); *G11B 5/855* (2013.01); *C08F 220/64* (2013.01); *C08F 222/1006* (2013.01); *G11B 5/65* (2013.01)

(58) Field of Classification Search
CPC .. C09D 125/08; C09D 125/18; C09D 133/14; C09D 147/00
USPC ............... 106/287.24; 522/183, 188; 524/577
See application file for complete search history.

(56) References Cited

U.S. PATENT DOCUMENTS

| | | | |
|---|---|---|---|
| 8,715,906 B2 * | 5/2014 | Blanchet et al. ........... 430/271.1 |
| 2005/0186356 A1 | 8/2005 | Hattori et al. | |
| 2007/0214987 A1 * | 9/2007 | Sonokawa et al. ............ 101/454 |
| 2007/0217075 A1 | 9/2007 | Kamata et al. | |
| 2009/0263631 A1 | 10/2009 | Sakamoto et al. | |
| 2010/0302679 A1 | 12/2010 | Kamata et al. | |
| 2011/0019307 A1 | 1/2011 | Arai et al. | |
| 2014/0235743 A1 * | 8/2014 | Kato et al. ....................... 522/64 |

FOREIGN PATENT DOCUMENTS

| | | |
|---|---|---|
| JP | A-2005-100496 | 4/2005 |
| JP | A-2005-235356 | 9/2005 |
| JP | A-2006-120222 | 5/2006 |
| JP | A-2007-72374 | 3/2007 |
| JP | A-2007-250091 | 9/2007 |
| JP | A-2009-226750 | 10/2009 |
| JP | A-2009-259370 | 11/2009 |
| WO | 2009/116431 A1 | 9/2009 |

OTHER PUBLICATIONS

International Search Report issued in International Patent Application No. PCT/JP2011/079655 dated Apr. 10, 2012.
Written Opinion of the International Searching Authority issued in International Patent Application No. PCT/JP2011/079655 dated Apr. 10, 2012.
Jul. 7, 2015 Office Action issued in Chinese Application No. 201180061314.7.

\* cited by examiner

*Primary Examiner* — Shamim Ahmed
(74) *Attorney, Agent, or Firm* — Oliff PLC

(57) ABSTRACT

There is provided a planarizing film-forming composition for a hard disk. A planarizing film-forming composition for a hard disk comprising a hydrophobic coating material having a photopolymerizable group and an aromatic group, containing a polymer or a combination of a polymer and a compound selected from the group consisting of a polymer (A1) including an aromatic group, having a molecular weight of 300 to 5000, and being a liquid at normal temperature under atmospheric pressure, a polymer (A2) including at least two photopolymerizable groups, having a molecular weight of 300 to 5000, and being a liquid at normal temperature under atmospheric pressure, a polymer (A3) including an aromatic group and at least two photopolymerizable groups, having a molecular weight of 300 to 5000, and being a liquid at normal temperature under atmospheric pressure, a compound (a1) including an aromatic group, having a molecular weight of 100 to 1000, and being a liquid at normal temperature under atmospheric pressure, a compound (a2) including at least two photopolymerizable groups, having a molecular weight of 100 to 1000, and being a liquid at normal temperature under atmospheric pressure, and a compound (a3) including an aromatic group and at least two photopolymerizable groups, having a molecular weight of 100 to 1000, and being a liquid at normal temperature under atmospheric pressure.

15 Claims, 1 Drawing Sheet

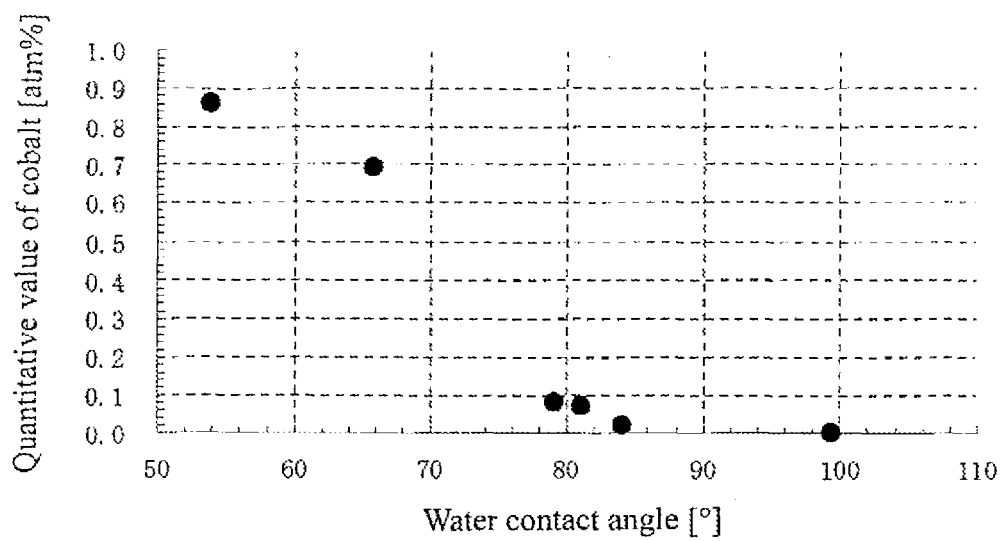

FILM FORMING COMPOSITION FOR HARD DISK

TECHNICAL FIELD

The present invention relates to a film-forming composition for a hard disk drive and a method for producing a hard disk device using the same. The film of the present invention has effects for planarization and suppression of a magnetic material from diffusing into a coating layer.

BACKGROUND ART

For hard disk drives, performance improvement of both heads and drive media (magnetic substances) have been advanced, and hard disk drives having higher capacity and smaller size have been developed.

From the viewpoint of the performance improvement of media drives, the drives having higher capacity have been developed by increasing surface recording densities. In the increase in the recording density, a magnetic field spreads at a magnetic head. To solve this problem, a smaller magnetic head has been developed, which has a limitation. Such magnetic field spreading does not become smaller than a certain value, and thus a phenomenon called "side write" occurs. When the side write occurs, writing to adjacent tracks occurs during recording. This causes data elimination by overwriting an already recorded data. The magnetic field spreading also causes reading of extra signals from the adjacent tracks during playing, and this generates cross talk.

In order to solve these disadvantages, technologies such as discreet track media and bit patterned media, in which tracks are physically and magnetically separated by filling gaps between the tracks with a non-magnetic material, have been proposed (Patent Document 1).

Filling of a non-magnetic material between tracks is performed by applying a film-forming composition including the non-magnetic material onto a magnetic layer having projections and recesses formed on a substrate and carrying out etch back to the surface of the magnetic layer using dry etching to form a plane at which a magnetic layer and a non-magnetic layer are leveled. This non-magnetic layer is in contact with the magnetic layer at a bottom part and a side part and the magnetic material may diffuse from the magnetic layer to the non-magnetic layer. A polysiloxane-based material is used for preventing the diffusion (Patent Document 2).

PRIOR ART DOCUMENTS

Patent Documents

Patent Document 1: Japanese Patent Application Publication No. 2005-100496 (JP 2005-100496 A)
Patent Document 2: Japanese Patent Application Publication No. 2009-259370 (JP 2009-259370 A)

SUMMARY OF THE INVENTION

Problem to be Solved by the Invention

An object of the present invention is to provide a non-magnetic filling agent, that is, a planarizing film-forming composition used in a method including forming fine grooves (several tens of nanometers) for the technologies such as the discreet track media and the bit patterned media, filling the grooves with the non-magnetic material, photo curing and planarizing it, and forming tracks alternately having a magnetic substance part and a non-magnetic substance part.

Required for this composition are sufficiently filling the fine groove and not generating shrinkage in the filled part at the time of photo curing (during exposure) and at the time of post exposure bake. For this filled part, prevention of diffusion of the magnetic material such as a cobalt component (for example, cobalt, aluminum, zirconium, chromium, nickel, zinc, iron, and ruthenium) to the filled part (the non-magnetic layer) is required. The present invention is to provide a planarizing film-forming composition for a hard disk that satisfies these performance requirements. The present invention is also to provide a method for producing a hard disk using such planarizing film-forming composition. The present invention is also to provide a composition for forming a diffusion prevention film for the magnetic material.

Means for Solving the Problem

The present invention includes, as a first aspect, a planarizing film-forming composition for a hard disk comprising a hydrophobic coating material having a photopolymerizable group and an aromatic group containing at least one polymer or a combination of at least one polymer and at least one compound selected from the group consisting of a polymer (A1) including an aromatic group, having a molecular weight of 300 to 5000, and being a liquid at normal temperature under atmospheric pressure, a polymer (A2) including at least two photopolymerizable groups, having a molecular weight of 300 to 5000, and being a liquid at normal temperature under atmospheric pressure, a polymer (A3) including an aromatic group and at least two photopolymerizable groups, having a molecular weight of 300 to 5000, and being a liquid at normal temperature under atmospheric pressure, a compound (a1) including an aromatic group, having a molecular weight of 100 to 1000, and being a liquid at normal temperature under atmospheric pressure, a compound (a2) including at least two photopolymerizable groups, having a molecular weight of 100 to 1000, and being a liquid at normal temperature under atmospheric pressure, and a compound (a3) including an aromatic group and at least two photopolymerizable groups, having a molecular weight of 100 to 1000, and being a liquid at normal temperature under atmospheric pressure;

as a second aspect, the planarizing film-forming composition according to the first aspect, in which the photopolymerizable group is an acrylate group, a methacrylate group, or a vinyl group;

as a third aspect, the planarizing film-forming composition according to the first aspect or the second aspect, in which the aromatic group is a group containing a benzene ring;

as a fourth aspect, the planarizing film-forming composition according to any one of the first aspect to the third aspect, in which the hydrophobic coating material is (A3) alone, a mixture of (A1) and (A2), a mixture of (A1) and (A3), a mixture of (A2) and (A3), a mixture of (A3) and (a3), a mixture of (A1) and (a3), or a mixture of (A1) and (a2);

as a fifth aspect, the planarizing film-forming composition according to any one of the first aspect to the third aspect, in which the hydrophobic coating material is (A3) alone or a mixture of (A1) and (a2);

as a sixth aspect, the planarizing film-forming composition according to any one of the first aspect to the fifth aspect, in which (A3) is a homopolymer or a copolymer;

as a seventh aspect, the planarizing film-forming composition according to any one of the first aspect to the sixth aspect, in which a planarizing film formed from the planarizing film-forming composition is a film having a hydrophobic property in which, in measurement of a water contact angle, a contact angle between the planarizing film and water is 70° to 150°;

as an eighth aspect, the planarizing film-forming composition according to any one of the first aspect to the seventh aspect, further including a photopolymerization initiator and a solvent;

as a ninth aspect, the planarizing film-forming composition according to any one of the first aspect to the eighth aspect, a film obtained from the planarizing film-forming composition is a film that can be planarized by carrying out etch back with a non-halogen dry etching gas;

as a tenth aspect, a method for producing a hard disk, the method including: a first process of forming projections and recesses on a magnetic substance; a second process of coating the projections and recesses with the planarizing film-forming composition as described in any one of the first aspect to the ninth aspect; and a third process of planarizing a surface of the coating film by etching and exposing a surface of the magnetic substance;

as an eleventh aspect, the method for producing a hard disk according to the tenth aspect, further including a fourth process of coating the surfaces with a hard material;

as a twelfth aspect, the method for producing a hard disk according to the tenth aspect or the eleventh aspect, in which the first process of forming the projections and recesses is carried out by a nano imprinting method;

as a thirteenth aspect, the method for producing a hard disk according to any one of the tenth aspect to the twelfth aspect, in which the third process of planarizing is carried out by dry etching;

as a fourteenth aspect, the method for producing a hard disk according to any one of the tenth aspect to the thirteenth aspect, in which the hard material used in the fourth process is diamond-like carbon; and as a fifteenth aspect, a composition for forming a magnetic material diffusion prevention film comprising a hydrophobic coating material, containing at least one polymer or a combination of at least one polymer and at least one compound selected from the group consisting of (A1), (A2), (A3), (a1), (a2), and (a3), and having a photopolymerizable group and an aromatic group.

Effects of the Invention

A film formed from the planarizing film-forming composition of the present invention has excellent a hydrophobic property because the planarizing film-forming composition includes a photopolymerizable hydrophobic coating material having an aromatic group. When the film formed from the planarizing film-forming composition is used as non-magnetic layers that are alternately arranged with magnetic layers, corrosion of a magnetic substance part caused by permeation of moisture in the air and diffusion of corrosive components into the non-magnetic layer can be prevented.

In the method for producing the hard disk of the present invention, the non-halogen gas, which does not etch the magnetic layer, can be used for the etch back of the obtained planarizing film because the planarizing film-forming composition is made of an organic-based compound, and thus, the method can prevent diffusion of the magnetic material to the non-magnetic layer part and prevent a mixed state of tracks.

In the method for producing the hard disk of the present invention, excellent filling property can be achieved when the planarizing film-forming composition is applied onto the magnetic layer in which fine grooves are formed and a film having high smoothness can be formed without reflow after the coating because the hydrophobic coating material in the planarizing film-forming composition used is a liquid component at normal temperature having a specific molecular weight. After etch back of the film formed as described above is carried out, a hard material such as diamond-like carbon can be suitably applied onto the surface formed after the etch back.

The film formed from the composition for forming a magnetic material diffusion prevention film of the present invention can suitably prevent the diffusion of the magnetic material.

BRIEF DESCRIPTION OF THE DRAWINGS

FIG. 1 is a graph illustrating a correlation between a quantitative value of cobalt on a planarizing film surface after a constant temperature and humidity test of the planarizing film applied onto a cobalt-coated substrate and a value of a water contact angle test of a planarizing film separately applied onto a cobalt-coated substrate.

MODES FOR CARRYING OUT THE INVENTION

Characteristics of the present invention become clear by comparing a composition using an inorganic-based compound with the composition using the organic-based compound used in the present invention, as a composition for filling fine grooves with a planarizing film-forming composition.

When a planarizing film-forming composition containing the inorganic-based compound is used, the planarizing film-forming composition is applied onto a substrate having projections and recesses; reflow is carried out by heating at a temperature of 200° C. or more; an inorganic coating is ground by CMP or wet etching and cured by heating; dry etching is carried out for planarization; and further, coating with diamond-like carbon is carried out.

When the planarizing film-forming composition according to the organic-based compound of the present invention is used, the planarizing film-forming composition is applied onto the substrate having projections and recesses and exposed; post exposure bake is carried out if needed; dry etching is carried out for planarization; and further, coating with diamond-like carbon is carried out.

When the planarizing film-forming composition containing the organic-based compound is used, fine grooves can be filled by only coating without reflow by heating. In other words, the reflow is not required in the coating process (the second process of the present invention).

When the inorganic-based material (for example, polysiloxane) is used, planarizing by dry etching is carried out after an inorganic coating part is removed by the CMP or the wet etching. In etch back of the inorganic-based material, etching is effectively carried out by a fluorine-based gas. It is known, however, that fluorine gas generates hydrofluoric acid (HF) when the etching is carried out. HF may cause corrosion of the magnetic material. A fluorine-based gas may also generate roughness at the film surface after the etching.

In the present invention, the planarizing film-forming composition including the non-magnetic substance made of the organic-based compound is applied by a coating method on the surface of the magnetic layer in which projections and recesses are formed. Thereafter, etch back is carried out with a non-halogen-based gas (for example, oxygen-based gas) and a smooth surface in which the magnetic layers and the non-magnetic layers are alternately arranged at the surface is formed by carrying out the etch back of the non-magnetic layer. Although the non-magnetic layer is etched the magnetic layer is not affected due to the etching using the oxygen-based gas.

In the filled part of the non-magnetic layer, diffusion (so-called cobalt corrosion) of the magnetic material such as the cobalt component into the non-magnetic layer part can be prevented and formation of mixed tracks caused by magnetization of both magnetic layers and non-magnetic layers can be prevented.

Subsequently, constituents of the composition of the present invention providing such characteristic operation and effect will be described. The present invention is the planarizing film-forming composition for a hard disk comprising a hydrophobic coating material having photopolymerizable groups and an aromatic group, containing at least one polymer or a combination of at least one polymer and at least one compound selected from the group consisting of a polymer (A1) including an aromatic group, having a molecular weight of 300 to 5000, and being a liquid at normal temperature under atmospheric pressure; a polymer (A2) including at least two photopolymerizable groups, having a molecular weight of 300 to 5000, and being a liquid at normal temperature under atmospheric pressure; a polymer (A3) including an aromatic group and at least two photopolymerizable groups, having a molecular weight of 300 to 5000, and being a liquid at normal temperature under atmospheric pressure; a compound (a1) including an aromatic group, having a molecular weight of 100 to 1000, and being a liquid at normal temperature under atmospheric pressure; a compound (a2) including at least two photopolymerizable groups, having a molecular weight of 100 to 1000, and being a liquid at normal temperature under atmospheric pressure; and a compound (a3) including an aromatic group and at least two photopolymerizable groups, having a molecular weight of 100 to 1000, and being a liquid at normal temperature under atmospheric pressure. The planarizing film-forming composition for a hard disk further includes a photopolymerization initiator and a solvent (organic solvent), and may include a surfactant, a photosensitizer and an ultraviolet absorber if needed.

The planarizing film-forming composition can be used in a solid content of 0.01% by mass to 20%, by mass, or 0.1% by mass to 10% by mass, or 0.1% by mass to 5% by mass. The solid content means a ratio of remaining components obtained by removing the solvent in the planarizing film-forming composition and is the components that are solidified by photocuring (and post exposure bake if needed).

The polymers and the compounds are preferably liquids at normal temperature under atmospheric pressure. The atmospheric pressure is usually 1 atmospheric pressure and the normal temperature means about 20° C.

The polymer is a polymer including an oligomeric low molecular weight polymer, and can be used as long as the polymer has a molecular weight in the range described above.

The hydrophobic coating material in the solid content can be used in the range of a ratio of 50% by mass to 99% by mass, or 60% by mass to 95% by mass, or 70% by mass to 90% by mass.

The photopolymerization initiator in the solid content can be used in the range of 0.5% by mass to 30% by mass, or 5% by mass to 30% by mass, or 10% by mass to 30% by mass.

The additive of the surfactant in the solid content can be used in the range of 0.0001% by mass to 1% by mass, or 0.001% by mass to 0.5% by mass.

The additive of the photosensitizer in the solid content can be used in the range of 0.01% by mass to 5% by mass, or 0.1% by mass to 1% by mass.

The additive of the ultraviolet absorber in the solid content can be used in the range of 0.01% by mass to 5% by mass, or 0.1% by mass to 1% by mass.

The hydrophobic coating material has at least two photopolymerizable groups. Examples of the photopolymerizable groups include an acrylate group, a methacrylate group, or a vinyl group.

The hydrophobic coating material has an aromatic group. Examples of the aromatic group include monocyclic aromatic ring such as a benzene ring and condensed rings of aromatic compounds such as naphthalene. The photopolymerizable group can be bonded to the aromatic group. A oligomer or a polymer having the aromatic group and the photopolymerizable group and having a molecular weight of about 300 to about 5000 can be used as the hydrophobic coating material.

As the polymer (A3) including an aromatic group and at least two photopolymerizable groups, having a molecular weight of 300 to 5000, and being a liquid at normal temperature under atmospheric pressure, both of a homopolymer being a polymer of a single compound having the aromatic group and the photopolymerizable groups and a copolymer of a compound having the aromatic group and a compound having the photopolymerizable groups can be used.

The compound (a3) including an aromatic group and at least two photopolymerizable groups, having a molecular weight of 100 to 1000, and being a liquid at normal temperature under atmospheric pressure is a compound including an aromatic group and at least two photopolymerizable groups in one molecule.

The aromatic group can have a substituent such as an alkyl group and an alkenyl group that does not inhibit the hydrophobic property. Groups such as an ester group, a carbonyl group, and an ether group existing at a linkage part of the vinyl group and the aromatic series such as an acrylate group may be contained.

A planarizing film obtained from the planarizing film-forming composition of the present invention exhibits the hydrophobic property provided by the hydrophobic coating material. Permeation of moisture in the air can be prevented by providing hydrophobic property to the non-magnetic layer, and thereby, corrosion to the magnetic layer component such as cobalt can be prevented and diffusion (so-called cobalt-corrosion) of corrosion composition of the magnetic substance such as cobalt to the non-magnetic layer can be prevented.

Evaluation of hydrophobic property can be determined by a water contact angle test. For example, 2 μL of a water droplet supplied from a 22G nozzle is brought into contact with the surface of a sample substrate on which a planarizing film is formed, and a contact angle between the contacted water droplet and the planarizing film can be measured by using a measurement device (fully automatic contact angle meter: Model DM 700, manufactured by Kyowa Interface Science Co., Ltd.). In this measurement, the contact angle of the hydrophobic coating material used in the present invention is in the range of 70° or more, and for example, 700 to 1500, or 70° to 85°. The planarizing film having the contact angle in such range can be preferably used.

The hydrophobic coating material is the polymer or the combination of the polymer and the compound, and these are preferably the single polymer of (A3), a polymer mixture of (A1) and (A2), a polymer mixture of (A1) and (A3), a polymer mixture of (A2) and (A3), a polymer and compound mixture of (A3) and (a3), a polymer and compound mixture of (A1) and (a3), or a polymer and compound mixture of (A1)

and (a2). Particularly, the single polymer of (A3) or the polymer and compound mixture of (A1) and (a2) is preferable.

(A3) may be a homopolymer or a copolymer.

The hydrophobic coating material is a styrene-based compound, and specific example of the styrene-based compound include a homopolymer of a photopolymerizable styrene-based compound, a copolymer of styrene and a photopolymerizable compound, a mixture of a styrene-based polymer or oligomer and a photopolymerizable compound, or a mixture of a styrene-based polymer or oligomer and a polymer or oligomer of a photopolymerizable compound.

Examples of the photopolymerizable styrene-based compound include divinylbenzene and styryl(meth)acrylate.

Examples of the photopolymerizable compound include an alkenyl(meth)acrylate. The alkenyl group can be exemplified as a $C_{2-10}$ alkenyl group. Examples of the alkenyl group include vinyl(meth)acrylate, allyl(meth)acrylate, 3-butenyl(meth)acrylate, 4-pentyl(meth)acrylate, and 5-hexyl(meth)acrylate.

Examples of the photopolymerizable compound include poly(meth)acrylate. The poly(meth)acrylate can be exemplified as a compound having 2 to 10 (meth)acrylate groups. These can have a substituent such as hydroxy group.

Examples of the oligomer of the photopolymerizable compound include oligomer of alkenyl(meth)acrylate and include the oligomer of alkenyl(meth)acrylate described above.

For example, the homopolymer and the copolymer of the hydrophobic compound can be exemplified as follows.

Formula (1-1)

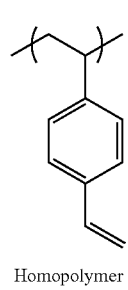

Homopolymer

Formula (1-2)

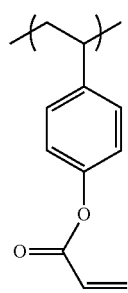

Homopolymer

Formula (1-3)

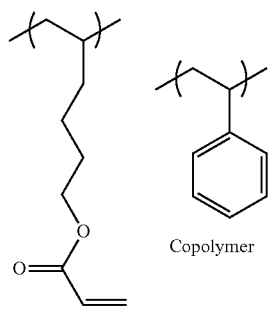

Copolymer

Formula (1-4)

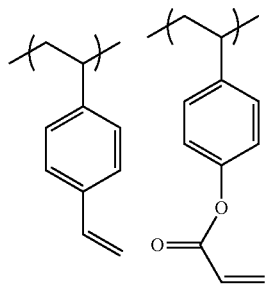

Copolymer

Formula (1-5)

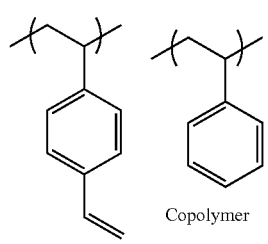

Copolymer

Formula (1-6)

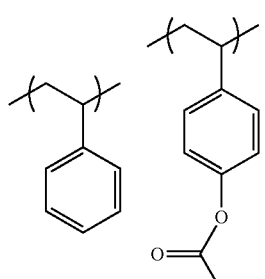

Copolymer

Formula (1-7)

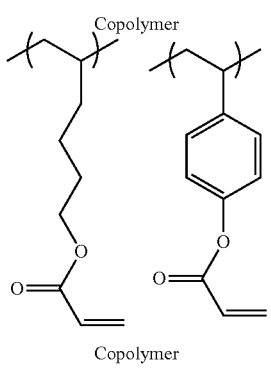

Copolymer

The mixture of the styrene-based polymers or oligomers and the photopolymerizable compounds can be exemplified as follows.

Formula (2-1)

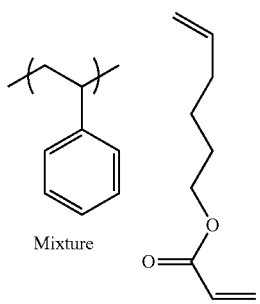

Mixture

-continued

Formula (2-2)

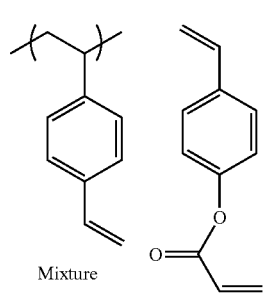

Mixture

Formula (2-3)

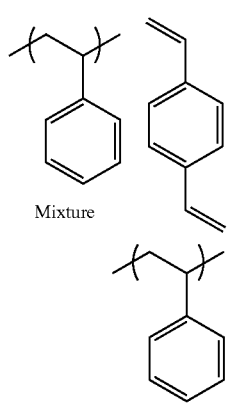

Mixture

Formula (2-4)

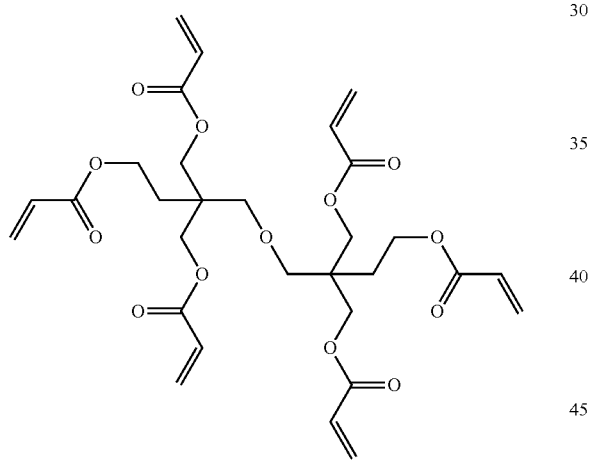

Mixture

The mixture of the styrene-based polymer or the mixture of the styrene-based oligomers, and the mixture of the styrene-based polymer or oligomer and the photopolymerizable polymer or oligomer can be exemplified as follows.

Formula (3-1)

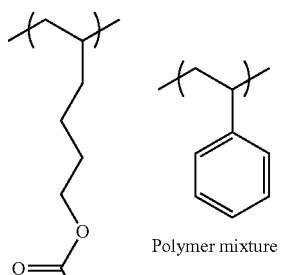

Polymer mixture

Formula (3-2)

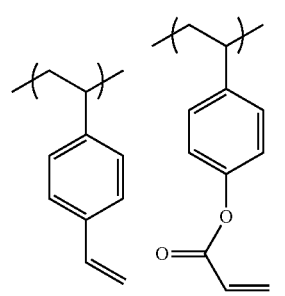

Polymer mixture

Formula (3-3)

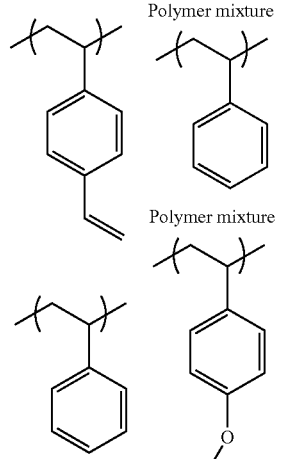

Polymer mixture

Formula (3-4)

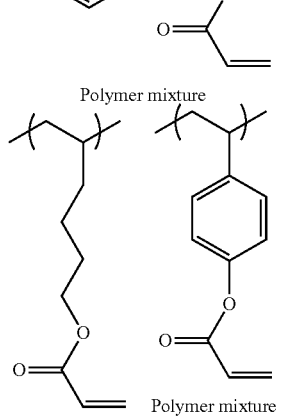

Polymer mixture

Formula (3-5)

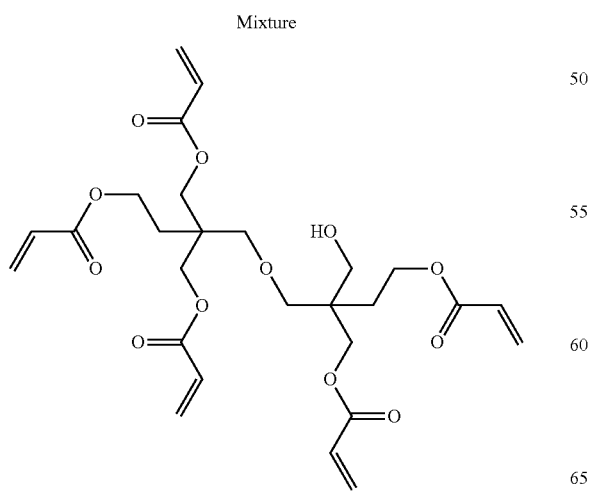

Polymer mixture

The photopolymerization initiator in the planarizing film-forming composition of the present invention is not particularly limited as long as the photopolymerization initiator is a compound having a function that initiates polymerization of the photopolymerizable group by light irradiation. Compounds that generate acids (Brønsted acids and Lewis acids), bases, radicals, or cations by light irradiation can be used. Particularly, the photo-radical polymerization initiator is preferably used.

Examples of the photo-radical polymerization initiator include IRGACURE 369 (trade name, Formula 4-1, manufactured by BASF Japan Co. Ltd., 2-benzyl-2-dimethylamino-1-(4-morpholinophenyl)-butanone-1), IRGACURE 500 (trade name, Formula 4-2, manufactured by BASF Japan Co. Ltd., L-hydroxycyclohexyl phenyl ketone+benzophenone), IRGACURE 819 (trade name, Formula 4-3, manufactured by BASF Japan Co. Ltd., bis(2,4,6-trimethylbenzoin)-phenylphosphineoxide), IRGACURE 651 (trade name, Formula 4-4, manufactured by BASF Japan Co. Ltd., 2,2-dimethoxy-1,2-diphenylethan-1-one), IRGACURE 184 (trade name, Formula 4-5, manufactured by BASF Japan Co. Ltd., 1-hydroxycyclohexyl phenyl ketone), DAROCUR 1173 (trade name, Formula 4-6, manufactured by BASF Japan Co. Ltd., 2-hydroxy-2-methyl-1-phenylpropan-1-one), IRGACURE 2959 (trade name, Formula 4-7, manufactured by BASF Japan Co. Ltd., 1-(4-(2-hydroxyethoxy)phenyl)-2-hydroxy-2-methyl-1-propan-1-one), IRGACURE 127 (trade name, Formula 4-8, manufactured by BASF Japan Co. Ltd., 2-hydroxy-1-(4-(4-(2-hydroxy-2-methylpropionyl)benzyl)phenyl)-2-methyl-propan-1-one), IRGACURE 907 (trade name, Formula 4-9, manufactured by BASF Japan Co. Ltd., 2-methyl-1-(4-methylthiophenyl)-2-morpholinopropan-1-one), IRGACURE 379 (trade name, Formula 4-10, manufactured by BASF Japan Co. Ltd., 2-(dimethylamino)-2-(4-(methylphenyl)methyl)-1-(4-(4-morpholinyl)phenyl)-1-butanone), and IRGACURE OXE01 (trade name, Formula 4-11, manufactured by BASF Japan Co. Ltd., 1,2-octanedione 1,4-(4-phenylthio)-2-(O-benzoyloxime)).

Formula (4-1)
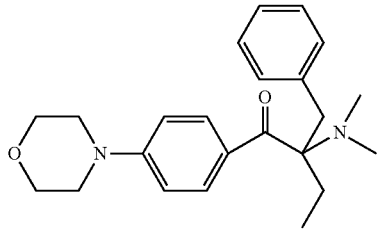

Formula (4-2)
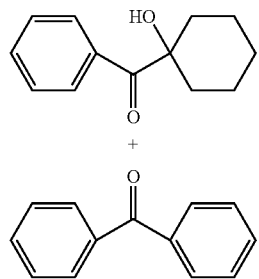

Formula (4-3)
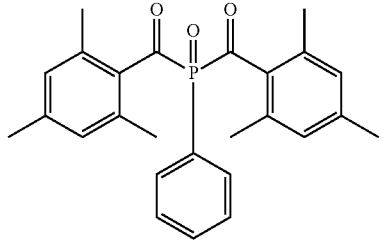

Formula (4-4)
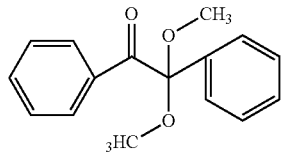

Formula (4-5)
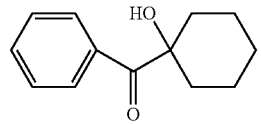

Formula (4-6)
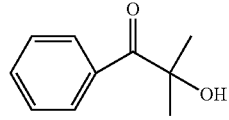

Formula (4-7)
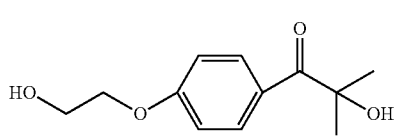

Formula (4-8)
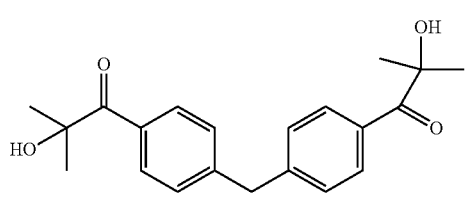

Formula (4-9)
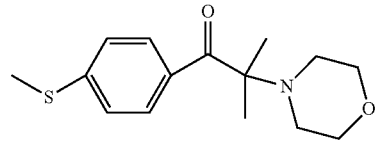

Formula (4-10)
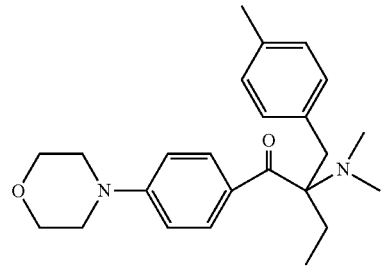

Formula (4-11)

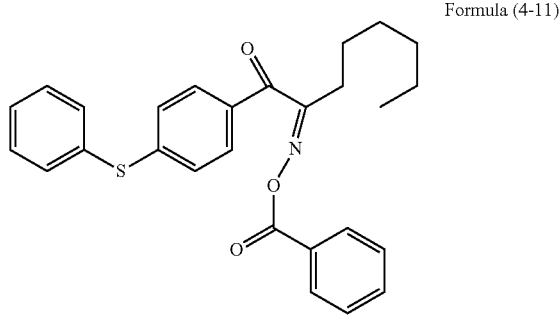

The planarizing film-forming composition of the present invention can contain the surfactant.

Examples of the surfactant may include nonionic surfactants including polyoxyethylene alkyl ethers such as polyoxyethylene lauryl ether, polyoxyethylene stearyl ether, polyoxyethylene cetyl ether, and polyoxyethylene oleyl ether; polyoxyethylene alkyl allyl ethers such as polyoxyethylene octylphenol ether and polyoxyethylene nonylphenol ether; polyoxyethylene-polyoxypropylene block copolymers, sorbitan fatty acid esters such as sorbitan mono-laurate, sorbitan mono-palmitate, sorbitan mono-stearate, sorbitan mono-olate, sorbitan tri-olate, and sorbitan tri-stearate, polyoxyethylene sorbitan fatty acid esters such as polyoxyethylene sorbitan mono-laurate, polyoxyethylene sorbitan mono-palmitate, polyoxyethylene sorbitan mono-stearate, polyoxyethylene sorbitan tri-olate, and polyoxyethylene sorbitan tri-stearate; fluorinated surfactants such as EFTOP EF301, EF303, and EF352 (trade name, manufactured by Tochem Products), MEGAFAC F171, F173, R-08, and R-30 (trade name, manufactured by Dainippon Ink and Chemicals, Inc.), Fluorad FC430 and FC431 (manufactured by Sumitomo 3M), and Asahiguard AG710, Surflon S-382, SC101, SC102, SC103, SC104, SC105, and SC106 (trade name, manufactured by Asahi Glass Co., Ltd.); and an organosiloxane polymer KP 341 (manufactured by Shin-Etsu Chemical Co., Ltd.). These surfactants can be used singly or in combination of two or more surfactants.

The planarizing film-forming composition of the present invention can contain the photosensitizer.

Examples of the photosensitizer include thioxanthene-based photosensitizers, xanthene-based photosensitizers, ketone-based photosensitizers, thiopyrylium salt-based photosensitizers, base styryl-based photosensitizers, merocyanine-based photosensitizers, 3-substituted coumnarin-based photosensitizers, 3,4-substituted coumarin-based photosensitizers, cyanine-based photosensitizers, acridine-based photosensitizers, thiazine-based photosensitizers, phenothiazine-based photosensitizers, anthracene-based photosensitizers, coronene-based photosensitizers, benzanthracene-based photosensitizers, perylene-based photosensitizers, merocyanine-based photosensitizers, ketocoumarin-based photosensitizers, fumarine-based photosensitizers, and borate-based photosensitizers.

The photosensitizer can be used singly or in combination of two or more photosensitizers. A wavelength in a UV region can be adjusted by using the photosensitizer.

Examples of the ultraviolet absorber include TINUVIN (registered trademark) PS, TINUVIN 99-2, TINUVIN 109, TINUVIN 328, TINUVIN 384-2, TINUVIN 400, TINUVIN 405, TINUVIN 460, TINUVIN 477, TINUVIN 479, TINUVIN 900, TINUVIN 928, TINUVIN 1130, TINUVIN 111FDL, TINUVIN 123, TINUVIN 144, TINUVIN 152, TINUVIN 292, TINUVIN 5100, TINUVIN 400-DW, TINUVIN 477-DW, TINUVIN 99-DW, TINUVIN 123-DW, TINUVIN 5050, TINUVIN 5060, and TINUVIN 5151 (manufactured by BASF Japan Co. Ltd.).

The ultraviolet absorber can be used singly or in combination of two or more ultraviolet absorbers. By using the ultraviolet absorber, a curing rate of a topmost surface of the film at the time of photocuring can be controlled and photo curability of the thin film may be improved.

The planarizing film-forming composition of the present invention can contain the hydrophobic coating material, the photopolymerization initiator and the organic solvent. Examples of the organic solvent include toluene, p-xylene, o-xylene, styrene, ethylene glycol dimethyl ether, propylene glycol monomethyl ether, ethylene glycol monomethyl ether, propylene glycol, propylene glycol monoethyl ether, ethylene glycol monoethyl ether, ethylene glycol mono-isopropyl ether, ethylene glycol methyl ether acetate, propylene glycol monomethyl ether acetate, ethylene glycol ethyl ether acetate, diethylene glycol dimethyl ether, propylene glycol monobutyl ether, ethylene glycol monobutyl ether, diethylene glycol diethyl ether, dipropylene glycol monomethyl ether, diethylene glycol monomethyl ether, dipropylene glycol monoethyl ether, diethylene glycol monoethyl ether, triethylene glycol dimethyl ether, diethylene glycol monoethyl ether acetate, diethylene glycol, 1-octanol, ethylene glycol, hexyleneglycol, trimethylene glycol, 1-methoxy-2-butanol, cyclohexanol, diacetone alcohol, furfuryl alcohol, tetrahydrofurfuryl alcohol, propylene glycol, benzyl alcohol, 1,3-butanediol, 1,4-butanediol, 2,3-butanediol, γ-butyrolactone, acetone, methyl ethyl ketone, methyl isopropyl ketone, diethyl ketone, methyl isobutyl ketone, methyl normal-butyl ketone, cyclohexanone, ethyl acetate, iso-propyl ketone acetate, normal-propyl acetate, iso-butyl acetate, normal-butyl acetate, methanol, ethanol, iso-propanol, tert-butanol, allyl alcohol, normal-propanol, 2-methyl-2-butanol, iso-butanol, normal-butanol, 2-methyl-1-butanol, 1-pentanol, 2-methyl-1-pentanol, 2-ethylhexanol, 1-octanol, ethylene glycol, hexyleneglycol, trimethylene glycol, 1-methoxy-2-butanol, diacetone alcohol, furfuryl alcohol, tetrahydrofurfuryl alcohol, propylene glycol, benzyl alcohol, isopropyl ether, 1,4-dioxane, N,N-dimethylformamide, N,N-dimethylacetamide, N-methylpyrrolidone, 1,3-dimethyl-2-imidazolidinone, dimethylsulfoxide, and N-cyclohexyl-2-pyrrolidinone.

The present invention is a method for producing a hard disk; the method including: a first process of forming projections and recesses on a magnetic substance; a second process of coating the projections and recesses with the planarizing film-forming composition; and a third process of planarizing the surface of the coating film by etching and exposing the surface of the magnetic substance.

In the first process of forming the projections and recesses on a magnetic substance, for example, a track pattern is formed on the magnetic substance by a photo or thermal nanoinmprinting method. The surface of the magnetic substance is processed by a dry etching method using this pattern to form the projections and recesses. At this time, an oxygen gas, an argon gas, and a fluorine-based gas can be used as the etching gas for dry etching. The etching gas is preferably oxygen and argon. Examples of the fluorine-based gas include tetrafluoromethane ($CF_4$), perfluorocyclobutane ($C_4F_8$), perfluoropropane ($C_3F_8$), trifluoromethane, and difluoromethane ($CH_2F_2$). When the dry etching is carried out using the fluorine-based gas, HF may be generated at the time of etching. This HF may corrode the magnetic substance.

As the second process, the planarizing film-forming composition of the present invention is applied to the projections and recesses formed on the surface of the magnetic substance.

As the coating, methods such as a spin coating method, a dipping method, a flow coating method, an ink jet method, a spraying method, a bar coating method, a gravure coating method, a roll coating method, a transferring printing method, brush coating, a blade coating method, and an air knife coating method can be employed.

The spin coating method can be preferably used. The planarizing film-forming composition can be applied in a rotation number of 10 rpm to 10000 rpm for 3 seconds to 60 seconds.

A film thickness can be set in the range of 5 nm to 10 μm, and particularly the planarizing film-forming composition can be used in the range of a film thickness of 5 nm to 100 nm because a size of the projections and recesses is several tens of nanometers.

The planarizing film-forming composition is applied on the magnetic substance having the surface with projections and recesses, and the surface with projections and recesses is filled with the planarizing film-forming composition. The planarizing film-forming composition is further applied onto the surface filled with the planarizing film-forming composition. The film forming composition is cured by photocuring.

The light irradiation can be carried out using a light having a wavelength of 150 nm to 1000 nm, or 200 nm to 700 nm, or 300 nm to 600 nm. The light irradiation can be carried out using, for example, a super-high pressure mercury lamp, a flash UV lamp, a high pressure mercury lamp, a low pressure mercury lamp, a DEEP-UV (deep ultraviolet) lamp, a xenon short arc lamp, a short arc metal halide lamp, a lump for pumping YAG laser, and a xenon flash lamp. The light irradiation can be carried out, for example, by using the super-high pressure mercury lamp and radiating whole wavelength light from about 250 nm to about 650 nm including bright line spectrum having peaks in a ultraviolet region of 289 nm, 297 nm, 303 nm, 313 nm (j line), 334 nm, and 365 nm (i line) and in a visible light region of 405 nm (h line), 436 nm (g line), 546 nm, and 579 nm. The light irradiation is carried out in an irradiation amount of 10 mW/cm$^2$ to 1000 mW/cm$^2$, or 10 mW/cm$^2$ to 100 mW/cm$^2$, and an irradiation time of 2 seconds to 100 seconds, or 5 seconds to 20 seconds.

After the exposure, post exposure bake can be carried out if needed. Conditions of the post exposure bake are adequately selected from a heating temperature of 50° C. to 170° C. and a heating time of 1 minute to 10 minutes.

A coated material of magnetic substance is an alloy made of combining metals such as cobalt, aluminum, zirconium, chromium, nickel, zinc, iron, and ruthenium. These magnetic substances may have a property that these magnetic substances are easy to corrode in the atmosphere, and thus, a diamond-like carbon having a thickness of several nanometers may be stacked on these magnetic substances.

In the third process, dry etching of the surface coated with the planarizing film is carried out until the surface of the magnetic substance is exposed, so as to planarize the surface of the magnetic substance and the surface of the planarizing film. As an etching gas used at this time, oxygen or a gas containing oxygen is used.

As described above, grooves of the non-magnetic substance (grooves filled with the planarizing film of the present invention) are formed on the magnetic substance surface (layer) as a track pattern. The magnetic substance surface (layer) and the non-magnetic substance surface (layer) form a planarized surface.

In the present invention, the planarized surfaces can be further coated with a hard material having a thickness of several tens of nanometers by vapor deposition as the fourth process. Examples of the hard material include diamond-like carbon.

EXAMPLES

The present invention will be described more specifically with reference to Examples and Comparative Examples. The present invention, however, is not limited to the Examples described below. Each measuring apparatus used in Examples is as follows.

For measurement of film thicknesses, the variable angle spectroscopic ellipsometer VASE manufactured by J. A. Woollam Japan Co., Inc. was used.

For measurement with an atomic force microscope, Nano Navi L-trace manufactured by SII nanotechnology Inc. was used, and SI-DF40 (the back surface was Al coated) was used as a cantilever.

As UV irradiation apparatus, the electrodeless lamp system QRE4016 manufactured by Ore Manufacturing Co., Ltd. was used and an illumination intensity was set to 20 mW/cm$^2$.

As an electron microscope, S-4800 manufactured by Hitachi High-Technologies Corporation was used.

For measurement of average molecular weights of polymers, Eco SEC HLC-8320GPC (trade name) manufactured by Tosoh Corporation was used.

For quantitative determination of cobalt, XPS was used and Quantera SXM manufactured by ULVAC-PHI, Inc. was used.

For measurement of contact angles, fully automatic contact angle meter: Model DM 700, manufactured by Kyowa Interface Science Co., Ltd. was used.

Example 1

To a 2 L four-necked flask equipped with a thermometer and a reflux tube, 5.00 g (0.0480 mol; a ratio of 70% by mole in a copolymer) of styrene, 2.97 g (0.0206 mol; a ratio of 30% by mole in the copolymer) of 4-hydroxybutyl acrylate, 0.56 g (0.0034 mol; 5% by mole to whole monomers, a radical polymerization initiator) of azobisisobutyronitrile, and 844.41 g of tetrahydrofuran (a solid content: 1.0% by mass) were charged. A pressure in the flask was reduced by a diaphragm pump and the atmosphere in the system was replaced with nitrogen. Subsequently, the reaction was carried out for 1 hour with refluxing the mixture at 66° C. using an oil bath and with stirring using a magnetic stirrer. After completion of the reaction, the mixture was naturally cooled to 23° C.

Aftertreatment of the reaction liquid was not carried out, and the reaction liquid was cooled to 0° C. using an ice bath while maintaining the nitrogen atmosphere. To the reaction liquid, 3.12 g (0.0309 mol; 1.5 equivalents to 4-hydroxybutyl acrylate) of triethylamine and 2.79 g (0.0309 mol; 1.5 equivalents to 4-hydroxybutyl acrylate) of acryloyl chloride were added using an injection syringe. With maintaining the reaction temperature from 0° C. to 5° C., the reaction was carried out for 3 hours, and thereafter, the ice bath was removed and the reaction was carried out at 23° C. for 40 hours.

After completion of the reaction, the reaction liquid was left in a refrigerator of 5° C. for 48 hours. The triethylamine hydrochloride salt in the reaction liquid was filtered, and 844.41 g of propylene glycol monomethyl ether acetate (PG-MEA) was added to the filtrate, and solvent displacement was carried out using an evaporator. The tetrahydrofuran was fully removed by distillation.

When GPC measurement of the reaction liquid was carried out, a solution of a polymer (PSA) having a Mw of 1007, a Mn of 548, and a Mw/Mn of 1.84 was obtained.

It was ascertained that the PSA was a liquid after the solvent was fully removed using the evaporator.

A reaction formula for obtaining the hydrophobic coating material (PSA) was illustrated below.

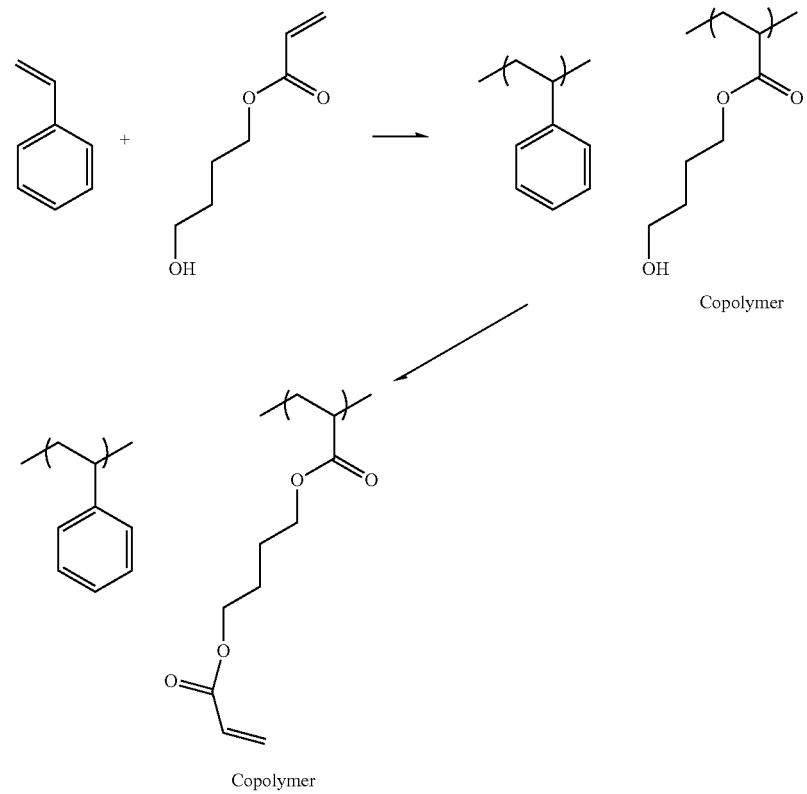

Copolymer

In a 500 mL single-necked flask, 200.00 g of 1% by mass PSA solution in PGMEA was weighed and 0.40 g of IRGACURE 369 (manufactured by BASF Japan Co. Ltd., a photopolymerization initiator) was added to the solution. To the solution, 0.50 g of 20% by mass 3-(trimethoxysilyl)propyl acrylate solution in PGMEA was added as an adhesion promoter; 2.00 g of 0.01% by mass MEGAFAC F-554 (manufactured by DIC Corporation) solution in PGMEA was added as a surfactant; and 47.12 g of PGMEA was added. Thereafter, the mixture was stirred at room temperature for 24 hours using a stirrer to prepare a homogenous clear solution (PSAV). Thus, a planarizing film-forming composition for a hard disk was obtained.

Example 2

To a 2 L four-necked flask equipped with a thermometer and a reflux tube, 4.00 g (0.0384 mol; a ratio of 50% by mole in a copolymer) of styrene, 5.00 g (0.0384 mol; a ratio of 50% by mole in the copolymer) of divinylbenzene, 0.17 g of Nafion 117 (manufactured by Sigma-Aldrich Co. LLC., a cationic polymerization initiator: a perfluorocarbon material having a skeleton made of carbon and fluorine and a perfluoro side chain including a sulfonic acid group), and 908.33 g of PGMEA (a solid content: 1.0% by mass) were charged. A pressure in the flask was reduced by a diaphragm pump and the atmosphere in the system was replaced with nitrogen. Subsequently, the reaction was carried out at 23° C. for 24 hours with stirring using a magnetic stirrer.

After completion of the reaction, floating Nafion 117 in the system was filtered to obtain the filtrate.

When GPC measurement of the reaction liquid was carried out, a solution of a polymer (PSD) having a Mw of 808, a Mn of 448, and a Mw/Mn of 1.80 was obtained.

It was ascertained that the PSD was a liquid after the solvent was fully removed using the evaporator.

A reaction formula for obtaining the hydrophobic coating material (PSD) was illustrated below.

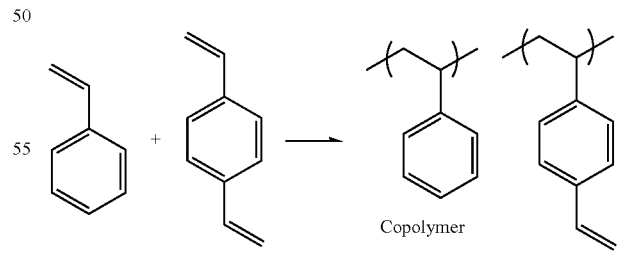

Copolymer

In a 500 mL single-necked flask, 200.00 g of 1% by mass PSD solution in PGMEA was weighed and 0.40 g of IRGACURE 369 (BASF Japan Co. Ltd., a photopolymerization initiator) was added to the solution. To the solution, 0.50 g of 20% by mass 3-(trimethoxysilyl)propyl acrylate solution in PGMEA was added as an adhesion promoter; 2.00 g of 0.01% by mass MEGAFAC F-554 (DIC Corporation) solution in PGMEA was added as a surfactant; and 47.12 g of PGMEA was added. Thereafter, the mixture was stirred at room temperature for 24 hours using a stirrer to prepare a homogenous clear solution (PSDV). Thus, a planarizing film-forming composition for a hard disk was obtained.

Example 3

To a 500 mL single-necked flask, 2.00 g of Piecolastic (trademark) A5 (Eastman Chemical Japan Ltd., a liquid polystyrene, a weight average molecular weight is 400) was weighted, and 0.50 g of a mixture of dipentaerythritol hexacrylate (trade name Kayarad DPHA, Nippon Kayaku Co., Ltd., a liquid polyacrylate compound: a mixture of pentacrylate and hexacrylate of dipentaerythritol, a weight average molecular weight is about 550) was added.

The hydrophobic coating material is illustrated below. This hydrophobic coating material is a mixture of the liquid polystyrene and the liquid polyacrylate compound.

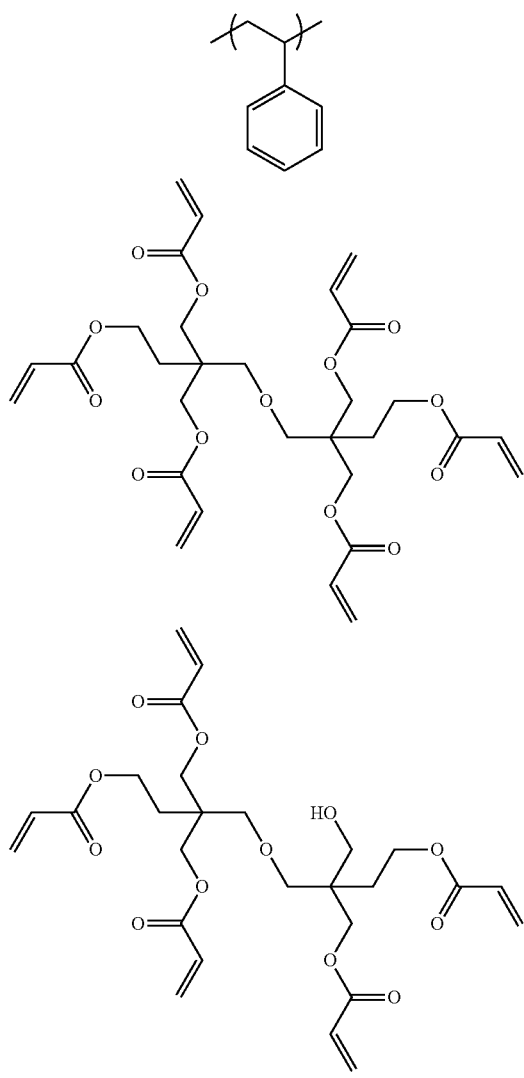

Mixture of polymer and compound

To this hydrophobic coating material, further, 0.50 g of IRGACURE 369 (BASF Japan Co. Ltd., the photopolymerization initiator) was added, and 0.63 g of 20% by mass 3-(trimethoxysilyl)propyl acrylate solution in PGMEA was added as an adhesion promoter; 2.50 g of 0.01% by mass MEGAFAC F-554 (DIC Corporation) solution in PGMEA was added as a surfactant; and 306.40 g of PGMEA was added. Thereafter, the mixture was stirred at room temperature for 24 hours using a stirrer to prepare a homogenous clear solution (SDV). Thus, a planarizing film-forming composition for a hard disk was obtained.

Comparative Example 1

The hydrophobic coating material was prepared. The hydrophobic coating material was the mixture of dipentaerythritol hexacrylate (trade name Kayarad DPHA, Nippon Kayaku Co., Ltd.), a liquid polyacrylate compound: a mixture of pentacrylate and hexacrylate of dipentaerythritol, a weight average molecular weight is 550).

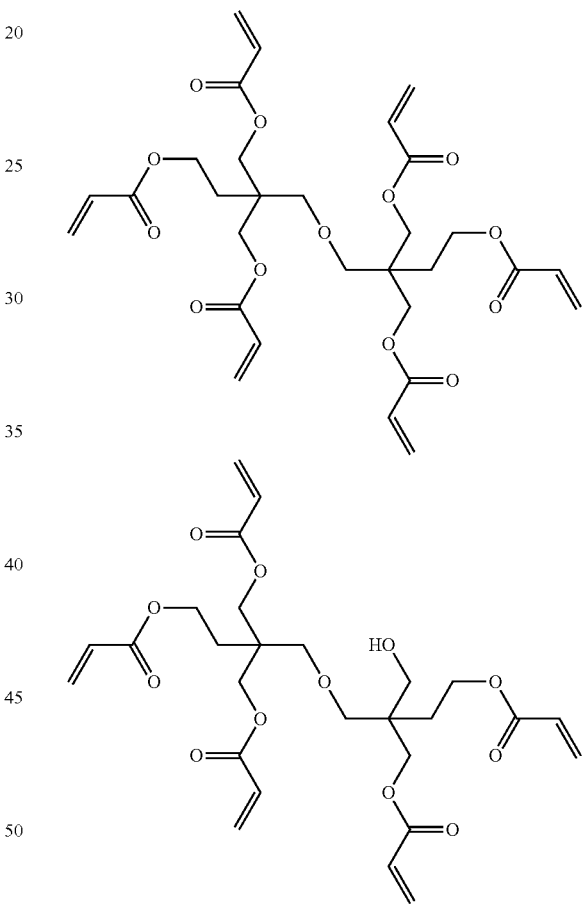

To a 500 mL egg-plant shaped flask, 2.00 g of a mixture of dipentaerythritol hexacrylate, trade name Kayarad DPHA (Nippon Kayaku Co., Ltd.) was weighed, and 0.40 g of IRGACURE 369 (BASF Japan Co. Ltd., the photopolymerization initiator) was added; 0.50 g of 20% by mass 3-(trimethoxysilyl)propyl acrylate solution in PGMEA was added as an adhesion promoter; 2.00 g of 0.01% by mass MEGAFAC R-30 (DIC Corporation) solution in PGMEA was added as a surfactant; and 245.12 g of PGMEA was added. Thereafter, the mixture was stirred at room temperature for 24 hours using a stirrer to prepare a homogenous clear solution (RV1). Thus, a planarizing film-forming composition for a hard disk was obtained.

Comparative Example 2

To a 500 mL egg-plant shaped flask, 5.00 g of 35% solution of a polymer (Mw=14300, Mn=5600, Osaka Organic Chemical Industry Ltd., a solid polymer) made by copolymerizing styrene and acrylic acid in 85:15 (a ratio in % by mol in the copolymer) in PGMEA was weighed.

This hydrophobic coating material was a copolymer of styrene and acrylic acid illustrated below.

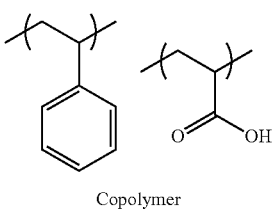

Copolymer

To this hydrophobic coating material, 0.35 g of GT-401 (Daicel Corporation, a multifunctional aliphatic cyclic epoxy resin: a component thereof is epoxidized butanetetracarboxylic acid tetrakis-(3-cyclohexenylmethyl) modified ε-caprolactone) was added; 0.44 g of 20% by mass 3-(trimethoxysilyl)propyl acrylate solution in PGMEA was added as an adhesion promoter; 1.75 g of 0.01% by mass MEGAFAC F-554 (DIC Corporation) solution in PGMEA was added as a surfactant; and 211.23 g of PGMEA was added. Thereafter, the mixture was stirred at room temperature for 24 hours using a stirrer to prepare a homogenous clear solution (RV2). Thus, a planarizing film-forming composition for a hard disk was obtained.

Comparative Example 3

To a 500 mL egg-plant shaped flask, 2.00 g of polystyrene (Mw=2000, Wako Pure Chemical Industries, Ltd., a solid polymer) was weighed.

This hydrophobic coating material was the polystyrene illustrated below.

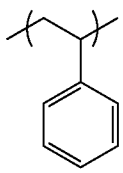

To the hydrophobic coating material, further; 0.50 g of 20% by mass 3-(trimethoxysilyl)propyl acrylate solution in PGMEA was added as an adhesion promoter; 2.00 g of 0.01% by mass MEGAFAC F-554 (DIC Corporation) solution in PGMEA was added as a surfactant, and 205.52 g of PGMEA was added. Thereafter, the mixture was stirred at room temperature for 24 hours using a stirrer to prepare a homogenous clear solution (RV3). Thus, a planarizing film-forming composition for a hard disk was obtained.

<Planarization Property by AFM (Atomic Force Microscope)>

PASV, PSDV, and SDV prepared in Examples 1 to 3 and RV1, RV2, and RV3 prepared in Comparative Examples 1 to 3 were concentrated under reduced pressure using an evaporator so that solid contents thereof were adjusted to 4.0% by mass.

Spin coating was carried out onto a substrate having a structure using the varnish (the planarizing film-forming composition for a hard disk) in which the solid content was adjusted to 4.0% by mass. The material of the substrate having the structure was silicon, and the substrate in which a depth was 100 nm and lines and spaces are formed at equal intervals of 30 nm was used. Conditions of the spin coating were the same as the conditions under which a film having a thickness of 85 nm could be formed onto the silicon substrate having no structure.

The formed film surface after the structure was embedded was measured by AFM, and an average surface roughness ($R_a$) and a maximum surface roughness ($R_{max}$) were measured. The measured position of AFM was in a perpendicular direction to the direction where the lines and the spaces are located and the measured area was 5 μm×5 μm.

(Measurement of AFM (Atomic Force Microscope))

A film was formed by a spin coating method onto a substrate having the structure using the PSAV varnish (a solid content of the planarizing film-forming composition for a hard disk obtained in Example 1 was adjusted to 4.0% by mass) in which the solid content was adjusted to 4.0% by mass. After the spin coating, the film was irradiated with light using the UV irradiation apparatus (main wavelength 380 nm) under conditions of an illumination intensity of 20 mW/cm² for 10 seconds (200 mJ/cm²) under the atmosphere.

Smoothness of the film after the light irradiation of the structure was evaluated using AFM. The measurement result by the AFM is shown in Table 1.

A film was formed using PSDV varnish having a solid content of 4.0% by mass (a solid content of the planarizing film-forming composition for a hard disk obtained in Example 2 was adjusted to 4.0% by mass) by a method similar to the method in which the PSAV varnish was used, and the AFM measurement was carried out. The measurement result by the AFM is shown in Table 1.

A film was formed using SDV varnish having a solid content of 4.0% by mass (a solid content of the planarizing film-forming composition for a hard disk obtained in Example 3 was adjusted to 4.0% by mass) by a method similar to the method in which the PSAV varnish was used, and the AFM measurement was carried out. The measurement result by the AFM is shown in Table 1.

A film was formed using RV1 varnish having a solid content of 4.0% by mass (a solid content of the planarizing film-forming composition for a hard disk obtained in Comparative Example 1 was adjusted to 4.0% by mass) by a method similar to the method in which the PSAV varnish was used, and the AFM measurement was carried out. The measurement result by the AFM is shown in Table 1.

A film was formed by a spin coating method onto a substrate having the structure using RV2 varnish (a solid content of the planarizing film-forming composition for a hard disk obtained in Comparative Example 2 was adjusted to 4.0% by mass) in which the solid content was adjusted to 4.0% by mass. After the spin coating, the film was baked under the atmosphere using a hot plate at a temperature of 200° C. for 5 minutes. After baking the film, AFM measurement was carried out. The measurement result by the AFM is shown in Table 1.

A film was formed using RV3 varnish having a solid content of 4.0% by mass (a solid content of the planarizing film-forming composition for a hard disk obtained in Comparative Example 3 was adjusted to 4.0% by mass) by a method similar to the method in which the RV2 varnish was used, and the AFM measurement was carried out. The measurement result by the AFM is shown in Table 1.

TABLE 1

Smoothness of coating film on substrate having structure

| | $R_a$ [nm] | $R_{max}$ [nm] |
|---|---|---|
| PSAV film | 0.113 | 0.449 |
| PSDV film | 0.102 | 0.425 |
| SDV film | 0.101 | 0.413 |
| RV1 film | 0.100 | 0.415 |
| RV2 film | 0.310 | 1.555 |
| RV3 film | 0.491 | 2.134 |

From the result in Table 1, it was found that each film of PSAV, PSDV, SDV and RV1 has excellent $R_a$ and has $R_{max}$ of 1 nm or less, and thus, each film embeds the structure well and has excellent smoothness. Solutes in the varnish being molecules having a liquid property under atmospheric pressure cause this result. It was found that this provides excellent smoothness of the film on the substrate having the structure.

In contrast, it was found that each film of RV2 and RV3 has $R_{max}$ of 1 nm or more, and thus, these films have large surface roughness. In the case of $R_{max}$ of 1 nm or more, when diamond-like carbon (DLC) is applied onto the planarizing material in a post-process, the roughness of the film is reflected to the DLC, following the roughness of the planarizing film. This may cause a crash with a head floating over the hard disk. A distance between the head and the hard disk of 5 nm or less is required, and it is important to have $R_{max}$ of 1 nm or less.

<Co Corrosion Test>

A cobalt corrosion test for each film of PSAV, PSDV, and SDV prepared in Examples 1 to 3 and each film of RV1, RV2, and RV3 prepared in Comparative Examples 1 to 3 was carried out.

As a substrate used, a substrate made by sputtering 200 nm of cobalt onto an Si substrate (manufactured by Global Net Corporation, a cobalt-coating substrate) was used.

XPS was used for detecting cobalt. In measurement conditions, an X ray of AlKa of 1486.6 eV (25 W, 15 kV), a measurement area of 1000 μm×1000 μm, a Pass Energy of 55.0 eV and 112.0 eV, and a Photoelectron Taku Off Angle of 45° from the substrate were used. Quantitative information of cobalt from the topmost surface to a depth of 10 nm in a film thickness direction can be obtained by XPS. A peak of cobalt measured by XPS is observed at about 778.2 eV.

A film of PSAV varnish (the planarizing film-forming composition for a hard disk obtained in Example 1) was formed by a spin coating method on an Si substrate on which 200 nm of cobalt was sputtered so that the thickness of the film is 20 nm. After the spin coating, the film was irradiated with light using the UV irradiation apparatus (main wavelength 380 nm) under conditions of an illumination intensity of 20 mW/cm² for 10 seconds (200 mJ/cm²) under the atmosphere.

Cobalt was quantitatively determined by measuring the topmost surface of the film after the light irradiation using XPS. Subsequently, the same film is left for 120 hours using a constant temperature and humidity chamber set to a temperature of 90° C. and a relative humidity of 90% RH. The topmost surface of the film after the constant temperature and humidity test was measured by XPS to quantitatively determine cobalt. The measurement result by the XPS is shown in Table 2.

A similar test to the test when the PSAV varnish was used was carried out using the PSDV varnish (the planarizing film-forming composition for a hard disk obtained in Example 2) and the XPS measurement was carried out. The measurement result by the XPS is shown in Table 2.

A test similar to the test when the PSAV varnish was used was carried out using the SDV varnish (the planarizing film-forming composition for a hard disk obtained in Example 3) and the XPS measurement was carried out. The measurement result by the XPS is shown in Table 2.

A similar test to the test when the PSAV varnish was used was carried out using the RV1 varnish (the planarizing film-forming composition for a hard disk obtained in Comparative Example 1) and the XPS measurement was carried out. The measurement result by the XPS is shown in Table 2.

A film of the RV2 varnish (the planarizing film-forming composition for a hard disk obtained in Comparative Example 2) was formed by a spin coating method on an Si substrate on which 200 nm of cobalt was sputtered so that the film thickness is 20 nm. After the spin coating, the film was baked under the atmosphere using a hot plate having a temperature of 200° C. for 5 minutes. The topmost surface of the film after the baking was measured by XPS to quantitatively determine cobalt. Subsequently, the same film is left for 120 hours using a constant temperature and humidity chamber set to a temperature of 90° C. and a relative humidity of 90% RH. The topmost surface of the film after the constant temperature and humidity test was measured by XPS to quantitatively determine cobalt. The measurement result by the XPS is shown in Table 2.

A similar test to the test when the RV2 varnish was used was carried out using the RV3 varnish (the planarizing film-forming composition for a hard disk obtained in Comparative Example 3) and the XPS measurement was carried out. The measurement result by the XPS is shown in Table 2.

Cobalt was quantitatively determined by measuring the topmost surface of the cobalt substrate to which the planarizing film was not applied using XPS. Subsequently, the cobalt substrate is left for 120 hours using a constant temperature and humidity chamber set to a temperature of 90° C. and a relative humidity of 90% RH. The topmost surface of the cobalt substrate after the constant temperature and humidity test was measured by XPS to quantitatively determine cobalt. The measurement result by the XPS is shown in Table 2.

TABLE 2

Quantitative value of cobalt

| | Before constant temperature and humidity test [atm %] | After constant temperature and humidity test [atm %] |
|---|---|---|
| PSAV film | 0.00 | 0.07 |
| PSDV film | 0.00 | 0.02 |
| SDV film | 0.00 | 0.08 |
| RV1 film | 0.00 | 0.86 |
| RV2 film | 0.01 | 0.69 |
| RV3 film | 0.00 | 0.00 |
| Cobalt substrate | 4.87 | 9.54 |

From the result in Table 2, a quantitative value of cobalt before the constant temperature and humidity test was 0.00 atm %, and thus, cobalt did not exist on the topmost surface of each film right after film forming. Quantitative values of cobalt of the cobalt substrate, which was tested for reference, were significantly high values of 4.87 atm % before the constant temperature and humidity test and 9.54 atm % after the constant temperature and humidity test.

Quantitative values of cobalt in each film of PSAV, PSDV, SDV, and RV3 after the constant temperature and humidity test were 0.1 atm % or less. From this result, it was found that a proportion of diffused cobalt at the surface of the planarizing film was significantly small. On the other hand, quantitative values of cobalt in the films of RV1 and RV2 after the constant temperature and humidity test were 0.86 atm % and 0.69 atm %, respectively. From this result, it was found that cobalt was diffused at the surface of the planarizing film. The reason why cobalt is detected despite the fact that RV2 is a polymer having a polystyrene skeleton is that RV2 contains a carboxylic acid as a polar group. It was found that the carboxylic acid corroded the cobalt substrate because the carboxylic acid acted as a Lewis acid.

A case in which RV2 was used as a non-magnetic film of a discreet pattern media in a hard disk is considered. Because a non-magnetic substance and a magnetic substance were separated in magnetic property, cobalt that is the magnetic substance is diffused from the magnetic substance into the non-magnetic substance at the time of carrying out a reliability test after completion of device assembly. This may cause side write and cross talk and cause a problem.

It is considered that the phenomenon of detecting the magnetic substance in the non-magnetic substance is caused in a manner that the cobalt substrate that is a magnetic substance is ionized with acids, alkalis, or water vapor to corrode cobalt substrate (corrosion), and then the ionized component diffuses to the non-magnetic substance (migration). Non-detection of cobalt from the surface of the non-magnetic substance after the constant temperature and humidity test means that the non-magnetic substance does not corrode the cobalt substrate that is the magnetic substance and cobalt does not diffuse, and thus a highly reliable hard disk can be provided.

<Measurement of Water Contact Angle>

Water contact angles of films obtained in Examples 1 to 3 and Comparative Examples 1 to 3 were measured.

The film of the PSAV varnish (the planarizing film-forming composition for a hard disk obtained in Example 1) was formed on a cobalt substrate by a spin coating method so that the thickness of the film is 20 nm. After the spin coating, the film was irradiated with light using the UV irradiation apparatus (main wavelength 380 nm) under conditions of an illumination intensity of 20 mW/cm$^2$ for 10 seconds (200 mJ/cm$^2$) under the atmosphere. A water contact angle of the PSAV film applied onto the cobalt substrate was measured. The measurement result is shown in Table 3.

A water contact angle of a PSDV film was measured by a method similar to the method in which the PSAV film was used. The measurement result is shown in Table 3.

A water contact angle of a SDV film was measured by a method similar to the method in which the PSAV film was used. The measurement result is shown in Table 3.

A water contact angle of a RV1 film was measured by a method similar to the method in which the PSAV film was used. The measurement result is shown in Table 3.

A film of the RV2 varnish (the planarizing film-forming composition for a hard disk obtained in Comparative Example 2) was formed by a spin coating method on a cobalt substrate so that the film thickness is 20 nm. After the spin coating, the film was baked under the atmosphere using a hot plate at a temperature of 200° C. for 5 minutes.

A water contact angle of the RV2 film applied onto the cobalt substrate was measured. The measurement result is shown in Table 3.

A water contact angle of a RV3 film was measured by a method similar to the method in which the RV2 film was used. The measurement result is shown in Table 3.

The measurement of the water contact angle was carried out by using a needle of 22G, constantly dropping 2.0 μL of water, and using a θ/2 method in accordance with the Young's formula.

TABLE 3

| Water contact angle of planarizing film | |
|---|---|
| | Water contact angle [°] |
| PSAV film | 81.2 |
| PSDV film | 84.1 |
| SDV film | 79.1 |
| RV1 film | 54.0 |
| RV2 film | 65.8 |
| RV3 film | 99.4 |

From the result in Table 3, it was found that the films of PSAV, PSDV, SDV, and RV3 had water contact angles of 70° or more. On the other hand, the films of RV1 and RV2 had water contact angles of 70° or less.

It was found that results of these water contact angles have a correlation with the test result of cobalt corrosion shown in Table 2. The correlation is illustrated in FIG. 1. FIG. 1 is a graph illustrating a correlation between a quantitative value of cobalt on a planarizing film surface after a constant temperature and humidity test of the planarizing film applied onto a cobalt-coated substrate and a value of a water contact angle test of a planarizing film separately applied onto a cobalt-coated substrate. The vertical axis represents quantitative value of cobalt (atom %) and the horizontal axis represents measured values of water contact angles (°). In other word, it became clear that cobalt corrosion was able to be significantly reduced by using a hydrophobic organic film having a water contact angle of 70° or more.

The planarizing film as a non-magnetic substance of a hard disk drive (HDD) requires that smoothness of the surface of the organic film after embedding the structure is 1 nm or less and corrosion or migration of cobalt after the constant temperature and humidity test can be prevented, and thus, it was found that each film of PSAV, PSDV, and SDV was excellent. In contrast, the film of RV1 has excellent smoothness but has poor cobalt corrosion; the film of RV2 has poor smoothness and poor cobalt corrosion; and the film of RV3 has excellent cobalt corrosion but has poor smoothness. Both smoothness and cobalt corrosion are required to be excellent. The planarizing film-forming composition according to the present invention that satisfies both smoothness and cobalt corrosion can be preferably used as the planarizing film for HDD.

Industrial Applicability

The planarizing film-forming composition for a hard disk can be used for planarizing fine grooves (several tens of nanometers) in the production process of a hard disk drive (HDD) and a filled part can prevent diffusion of magnetic materials such as a cobalt component into the filled part (a non-magnetic layer).

The invention claimed is:

1. A planarizing film-forming composition for a hard disk comprising a hydrophobic coating material including a styrene-based compound having a photopolymerizable group and an aromatic group and containing at least one polymer or a combination of at least one polymer and at least one compound selected from the group consisting of a polymer (A1) including an aromatic group, having a molecular weight of 300 to 5000, and being a liquid at normal temperature under atmospheric pressure, a polymer (A2) including at least two photopolymerizable groups, having a molecular weight of 300 to 5000, and being a liquid at normal temperature under atmospheric pressure, a polymer (A3) including an aromatic group and at least two photopolymerizable groups, having a molecular weight of 300 to 5000, and being a liquid at normal temperature under atmospheric pressure, a compound (a1)

including an aromatic group, having a molecular weight of 100 to 1000, and being a liquid at normal temperature under atmospheric pressure, a compound (a2) including at least two photopolymerizable groups, having a molecular weight of 100 to 1000, and being a liquid at normal temperature under atmospheric pressure, and a compound (a3) including an aromatic group and at least two photopolymerizable groups, having a molecular weight of 100 to 1000, and being a liquid at normal temperature under atmospheric pressure.

2. The planarizing film-forming composition according to claim 1, wherein the photopolymerizable group is an acrylate group, a methacrylate group, or a vinyl group.

3. The planarizing film-forming composition according to claim 1, wherein the aromatic group is a group containing a benzene ring.

4. The planarizing film-forming composition according to claim 1, wherein the hydrophobic coating material is (A3) alone, a mixture of (A1) and (A2), a mixture of (A1) and (A3), a mixture of (A2) and (A3), a mixture of (A3) and (a3), a mixture of (A1) and (a3), or a mixture of (A1) and (a2).

5. The planarizing film-forming composition according to claim 1, wherein the hydrophobic coating material is (A3) alone or a mixture of (A1) and (a2).

6. The planarizing film-forming composition according to claim 1, wherein (A3) is a homopolymer or a copolymer.

7. The planarizing film-forming composition according to claim 1, wherein a planarizing film formed from the planarizing film-forming composition is a film having a hydrophobic property in which, in measurement of a water contact angle, a contact angle between the planarizing film and water is 70° to 150°.

8. The planarizing film-forming composition according to claim 1, further comprising a photopolymerization initiator and a solvent.

9. The planarizing film-forming composition according to claim 1, wherein a film obtained from the planarizing film-forming composition is a film that is capable of planarizing by etch back with a non-halogen dry etching gas.

10. A method for producing a hard disk, the method comprising:
a first process of forming projections and recesses on a magnetic substance;
a second process of coating the projections and the recesses with the planarizing film-forming composition as claimed in claim 1; and
a third process of planarizing a surface of the coating film by etching and exposing a surface of the magnetic substance.

11. The method for producing a hard disk according to claim 10, further comprising a fourth process of coating the surfaces with a hard material.

12. The method for producing a hard disk according to claim 10, wherein the first process of forming projections and recesses is carried out by a nano imprinting method.

13. The method for producing a hard disk according to claim 10, wherein the third process of planarizing is carried out by dry etching.

14. The method for producing a hard disk according to claim 10, wherein the hard material used in the fourth process is diamond-like carbon.

15. A composition for forming a magnetic material diffusion prevention film, the composition comprising a hydrophobic coating material as claimed in claim 1.

* * * * *